(12) United States Patent
Wong et al.

(10) Patent No.: US 9,994,686 B2
(45) Date of Patent: Jun. 12, 2018

(54) BIODEGRADABLE FILM AND LAMINATE

(71) Applicant: U.S. Pacific Nonwovens Industry Limited, Kowloon (HK)

(72) Inventors: Cho Kee Wong, Kowloon (HK); Larry Clifton Wadsworth, Knoxville, TN (US)

(73) Assignee: U.S. PACIFIC NONWOVENS INDUSTRY LIMITED, Hong Kong (HK)

( * ) Notice: Subject to any disclaimer, the term of this patent is extended or adjusted under 35 U.S.C. 154(b) by 0 days. days.

(21) Appl. No.: 14/653,180

(22) PCT Filed: Feb. 18, 2013

(86) PCT No.: PCT/CN2013/071649
§ 371 (c)(1),
(2) Date: Jun. 17, 2015

(87) PCT Pub. No.: WO2014/124563
PCT Pub. Date: Aug. 21, 2014

(65) Prior Publication Data
US 2015/0337094 A1 Nov. 26, 2015

(51) Int. Cl.
| | |
|---|---|
| C08J 5/18 | (2006.01) |
| B32B 27/12 | (2006.01) |
| B32B 27/36 | (2006.01) |
| C08L 67/04 | (2006.01) |
| B32B 5/06 | (2006.01) |
| B32B 5/22 | (2006.01) |
| B32B 5/26 | (2006.01) |
| D04H 1/43 | (2012.01) |
| B32B 5/02 | (2006.01) |
| D04H 1/435 | (2012.01) |
| B32B 27/20 | (2006.01) |
| B32B 7/12 | (2006.01) |
| B32B 27/18 | (2006.01) |

(52) U.S. Cl.
CPC ............... *C08J 5/18* (2013.01); *B32B 5/022* (2013.01); *B32B 5/024* (2013.01); *B32B 5/026* (2013.01); *B32B 5/06* (2013.01); *B32B 5/22* (2013.01); *B32B 5/26* (2013.01); *B32B 7/12* (2013.01); *B32B 27/12* (2013.01); *B32B 27/18* (2013.01); *B32B 27/20* (2013.01); *B32B 27/36* (2013.01); *C08L 67/04* (2013.01); *D04H 1/435* (2013.01); *B32B 2262/0253* (2013.01); *B32B 2262/0276* (2013.01); *B32B 2262/06* (2013.01); *B32B 2262/062* (2013.01); *B32B 2262/08* (2013.01); *B32B 2270/00* (2013.01); *B32B 2307/308* (2013.01); *B32B 2307/50* (2013.01); *B32B 2307/54* (2013.01); *B32B 2307/546* (2013.01); *B32B 2307/558* (2013.01); *B32B 2307/7163* (2013.01); *B32B 2437/00* (2013.01); *B32B 2439/00* (2013.01); *B32B 2535/00* (2013.01); *B32B 2555/00* (2013.01); *B32B 2571/00* (2013.01); *C08J 2301/02* (2013.01); *C08J 2367/02* (2013.01); *C08J 2367/04* (2013.01)

(58) Field of Classification Search
CPC .. C08L 67/04; C08L 2201/06; C08L 2203/16; C08L 2203/12; C08L 2205/25; C08L 2205/03; C08J 5/28; B32B 27/12; B32B 27/36; B32B 27/20; B32B 27/18; B32B 5/022; B32B 5/024; B32B 5/026; B32B 5/06; B32B 5/22; B32B 5/26; B32B 7/12; D04H 1/435
USPC ..................................... 524/539, 35
See application file for complete search history.

(56) References Cited

FOREIGN PATENT DOCUMENTS

| | | | |
|---|---|---|---|
| CN | 101157273 A | | 4/2008 |
| CN | 101423654 A | | 5/2009 |
| CN | 101942120 A | | 1/2011 |
| CN | 102219988 A | * | 10/2011 |
| CN | 102675839 A | * | 9/2012 |

OTHER PUBLICATIONS

International Search Report issued in corresponding International Application No. PCT/CN2013/071649, Nov. 28, 2013, 8 pages (with translation).
Written Opinion of the International Searching Authority issued in corresponding International Application No. PCT/CN2013/071649, Nov. 28, 2013, 9 pages (with translation).

* cited by examiner

*Primary Examiner* — Michael M Bernshteyn

(57) ABSTRACT

Disclosed are a biodegradable film and an enhanced biodegradable fabric and laminate prepared by laminated biodegradable films, which mainly comprise PBAT or PBS, or a mixture thereof, PLA and other degradable high molecular polymers, such as PBSA, PCL, PCL-BS and PHA, to prepare PLA, and a new mixture of PLA and PHAs, or a mixture of PLA with PBAT and PBS, or a mixture of PLA and PHAs with PBAT and PBS or other degradable high molecular polymers. The new fabrics and laminates have a stronger biodegradability in an environment containing microorganisms and have a good shelf life, and good strength, agility and flexibility.

4 Claims, No Drawings

BIODEGRADABLE FILM AND LAMINATE

FIELD OF THE INVENTION

This invention relates to biodegradable films, fabrics made of knitted, woven or nonwoven fabrics and laminates. Herein, the knitted, woven and nonwoven fabrics are preferably but not limited to be biodegradable.

BACKGROUND OF THE INVENTION

In the past 20 years, polylatic acid (PLA) has become a leading biodegradable/compostable polymer for preparation of plastics and fibers. This is because although the PLA is derived from natural and renewable materials, it is also thermoplastic and can be melt extruded to produce plastic items, fibers and fabrics with good mechanical strength and pliability comparable to oil-based synthetics such as polyolefins (polyethylene and polypropylene) and polyesters (polyethylene terephthalate and polybutylene terephthalate). PLA is made from lactic acid, which is a fermentation byproduct obtained from corn (e.g. Zea mays), wheat (e.g. Triticum spp.), rice (e.g. Oryza sativa), or sugar beets (e.g. Beta vulgaris). When polymerized, the lactic acid forms a dimer repeat unit with the following structures:

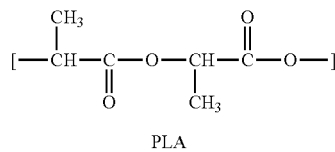

PLA

Unlike other synthetic fiber materials (such as cellulosics) originated from plant, PLA is more suited for melt spinning into fibers. Compared to the solvent-spinning process required for synthetic cellulosic fibers, PLA fiber made by adoption of melt spinning allows for lower economic cost and environmental cost, and the resulting PLA has a wider range of properties. Like polyethylene terephthalate polyester (PET), PLA polymer needs to be dried before melting to avoid hydrolysis during melt extrusion, and fiber from both polymers can be drawn (stretched) to develop better tensile strength. The PLA molecule tends to form a helical structure which brings about easier crystallization. Also the lactic dimer has three kinds of isomers: an L form which rotates polarized light in a clockwise direction, a D form which rotates polarized light in a counter-clockwise direction and a racemic form which is optically inactive. During polymerization, the relative proportions of these forms can be controlled, resulting in relatively broad control over important polymer properties. The control over a thermoplastic "natural" fiber polymer, unique polymer morphologies and the isomer content in the polymer enables the manufacturer to design a relatively broad range of properties in the fiber (Dugan, J. S. 2001, "Novel Properties of PLA Fibers", International Nonwovens Journal, 10 (3): 29-33; Khan, A. Y. A., L. C. Wadsworth, and C. M. Ryan, 1995, "Polymer-Laid Nonwovens from Poly(lactide) Resin", International Nonwovens Journal, 7: 69-73).

PLA is not considered to be directly biodegradable in its extruded state. Instead, it must first be hydrolyzed before it becomes biodegradable. In order to achieve hydrolysis of PLA at significant levels, both a relative humidity at or above 98% and a temperature at or above 60° C. are required simultaneously. Once these conditions are met, degradation occurs rapidly (Dugan, J. S. 2001, "Novel Properties of PLA Fibers", International Nonwovens Journal, 10 (3): 29-33 and Lunt, J. 2000, "Polylactic Acid Polymers for Fibers and Nonwovens", International Fiber Journal, 15: 48-52). However, the melt temperature can be controlled between about 120° C. and 175° C. so as to control the content and arrangement of the three isomers, in which case the polymer is completely amorphous under the low melting temperature. Some more amorphous polymers can be obtained after the addition of enzymes and microbes in the melt.

PLA has been used to make a number of different products, and factors that control its stability and degradation rate have been well documented. Both the L-lactic acid and D-lactic acid produced during fermentation can be used to produce PLA (Hartmann, M. H., 1998, "High Molecular Weight Polylactic Acid Polymers", p. 367-411, In: D. L. Kaplan (ed.), Biopolymers from Renewable Resources, Springer-Verlag, New York). One advantage of PLA is that the degradation rate can be controlled by altering factors such as the proportion of the L and D forms, the molecular weight or the degree of crystallization (Drumright, R. E., P. R., Gruber, and D. E. Henton, 2000, "Polylactic Acid Technology" Advanced Materials. 12: 1841-1846). For instance, Hartmann (1998) finds that unstructured PLA sample will rapidly degrade to lactic acid within weeks, whereas a highly crystalline material can take months to years to fully degrade. This flexibility and control make PLA a highly advantageous starting material in the production of agricultural mulch fabrics, where the PLA material is intended to be degraded in the field after a specific time period (Drumright, R. E., P. R., Gruber, and D. E. Henton, 2000, "Polylactic Acid Technology" Advanced Materials. 12: 1841-1846).

PLA is decomposed into smaller molecules through a number of different mechanisms, and the final decomposition products are $CO_2$ and $H_2O$. The degradation process is influenced by temperature, moisture, pH value, enzyme and microbial activity while keeping free of being affected by ultraviolet light (Drumright, R. E., P. R., Gruber, and D. E. Henton, 2000, "Polylactic Acid Technology" Advanced Materials. 12: 1841-1846; Lunt, 2000). In some early work that evaluated PLA degradation for biomedical applications, Williams (1981) finds that bromelain, pronase and proteinase K can accelerate the decomposition rate of PLA (Williams, D. F., 1981, "Enzymic Hydrolysis of Polylactic Acid," Engineering in Medicine. 10: 5-7). More recently, Hakkarainen et al. (2000) incubate PLA sample of 1.8 millimeter thickness at 86° F. in a mixed culture of microorganisms extracted from compost (Hakkarainen, M., S. Karisson, and A. C. Albertsson, 2000., "Rapid (Bio)degradation of Polylactide by Mixed Culture of Compost Microorganisms—Low Molecular Weight Products and Matrix Changes", Polymer. 41: 2331-2338). After 5 weeks of incubation, the compost-treated film has degraded to a fine powder, whereas the untreated control remains intact. It is noted that this study uses only the L form while the degradation rate will differ based on the ratio of the D and L forms. Regardless, the work by Hakkarainen et al. (2000) illustrates that application of large quantities of readily available microorganisms from compost can accelerate the decomposition. Yet the PLA degradation studies so far are either performed in liquid culture in vitro or in active composting operations above 140° F. (Drumright et al., 2000; Hakkarainen et al., 2000; Lunt, 2000; Williams, 1981). Rapid degradation occurs when PLA is composted at 140° F. with nearly 100% biodegradation achieved in 40 days (Drumright et al., 2000). However, the stability below 140° F. when the fabric is in contact with soil organic matter remains to be determined Spunbond (SB) and meltblown (MB) nonwovens using PLA are first researched by Larry Wadsworth (Khan et al., 1995) at the University of Tennessee, USA (Smith, B. R., L. C. Wadsworth (Speaker), M. G. Kamath, A. Wszelaki, and C. E. Sams, "*Development of Next Generation Biodegradable Mulch Nonwovens to Replace Polyethylene Plastic*," International Conference on Sustainable Textiles (ICST 08), Wuxi, China, Oct. 21-24, 2008[CD ROM]).

It is desirable for biodegradable polymers to resist many environmental factors during application period, but to be biodegradable under disposal conditions. The biodegradation of PLA is studied in both aerobic and anaerobic, aquatic and solid state conditions at different elevated temperatures. It is found that in aerobic aquatic exposure, PLA biodegrades very slowly at room temperature but faster under thermophilic conditions. This also supports the findings above that PLA must be hydrolyzed before microorganism can utilize it as a nutrient source. The biodegradation of PLA is much faster in anaerobic solid state conditions than that in aerobic conditions at the same elevated temperatures. In a natural composting process, the behavior of PLA is similar to the aquatic biodegradation exposure, in which biodegradation only starts after it is heated up. These results reinforced a widely held view that PLA is compostable and is stable under room temperature, but degrades rapidly during disposal of waste in compost or anaerobic treatment facilities (Itavaara, Merja, Sari Karjomaa and Johan-Fredrik Selin, "*Biodegradation of Polylactide in Aerobic and Anerobic Thermophilic Conditions*," Elsevier Science Ltd., 2002). In another study, the biodegradation levels of different plastics by anerobic digested sludge are determined and compared with those in simulated landfill conditions. Bacterial poly 93-hydroxyvalerate (PHB/PHV), natural aliphatic polyester produced by bacteria, almost completely degrades in 20 days in anaerobic digested sludge; whereas, PLA, the aliphatic polyester synthesized from natural materials, and two other aliphatic polyesters evaluated, poly (butylenes succinate) and poly (butylenes succinate-co-ethylene succinate) fail to degrade after 100 days. A cellulosic control material (cellophane) degrades in a similar way to that of PHB/HV within 20 days. Furthermore, PHB/HV degrades well within 6 months in simulated landfill conditions (Shin, Pyong Kyun, Myung Hee Kim and Jong Min Kim, "*Biodegradability of Degradable Plastics Exposed to Anaerobic Digested Sludge and Simulated Landfill Conditions*," Journal of Polymers and the Environment, 1566-2543, Volume 5, Number 1, 1997).

In the search for truly biodegradable polymer, polyhydroxyalkonates (PHAs) have been found to be naturally synthesized by a variety of bacteria as an intracellular storage material of carbon and energy. As early as the 1920s, poly[(R)-3-hydroxybutyrate] (P(3HB)) is isolated from *Bacillus megaterium* and identified later as a microbial reserve polyester. However, P(3HB) does not have important commercial value since it is found to be brittle and stiff over a long period and thus cannot be substituted for the mainstream synthetic polymers like polyethylene (PE) and polystyrene (PS). Eventually, the discovery of other hydroxalkonate (HA) units other than 3HB in microbial polyesters which can improve the mechanical and thermal properties when incorporated into P(3HB) have a major impact on research and commercial interests of bacterial polyesters. Their biodegradability in natural environment is one of the unique properties of PHA material. The microbial polyester is biodegradable in soil, sludge or sea water. Since PHA is a solid polymer with high molecular weight, it cannot be transported through the cell wall as a nutrient. Thus, the microorganisms such as fungi and bacteria excrete an enzyme knows as PHA degrading enzyme for performing extracellular degradation on PHA. Such enzyme hydrolyzes the solid PHA into water soluble oligomers and monomers, which can then be transported into the cell and subsequently metabolized as carbon and energy sources (Numata, Keiji, Hideki Abe and Tadahisa Iwata, "*Biodegradability of Poly (hydroxalkonate)Materials*," Materials,2, 1104-1126, 2009). A random copolyester of [R]-3-hydroxybutyrate and [R]-3-hydroxyvalerate, P(3HB-co-3HV), is commercially produced by Imperial Chemical Industries (ICI) in the UK. It is shown that *Alcaligenes eutrophus* produces an optically active copolyester of 3-hydroxybutyrate (3HB) and 3-hydroxyvalerate (3HV) by using propionic acid and glucose as the carbon sources (Holmes, PA, (1985), "*Applications of PHB: a Microbially Produced Biodegradable Thermoplastic*," Phys Technol 16:32-36 from Kunioka, Masao, Yasushi Kawaguchi and Yoshiharu Doi, "Production of Biodegradable copolyesters of 3-hydroxybutyrate and 4-hydroxybutyrate by *Alcaligenes eutropus*," Appl. Microbiol Biotechnol (1989) 30: 569-573). The chemical structure for P(2HB-co-3HV) is as follows:

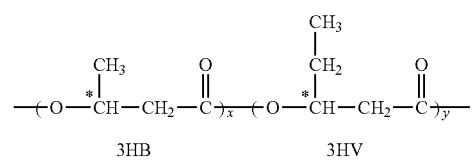

Furthermore, 3-hydroxypropionate, 4-hydroxyvutyrate, and 4-hydroxyvalerate are found to be new constituents of bacterial polyhdroxyalkonates (PHAs) and have gained much attention in a wide range of marine, agricultural and medical applications. More recently, the microbial synthesis of copolyesters of [R]-3-hydroxybutyrate and 4-hydroxybutyrate, P(3HB-co-4HB), by *Alcaligenes eutropus, Comamonas* and *Alcaligens latus* have been studied. The chemical structure of P(3HB-co-4HB) is as follows:

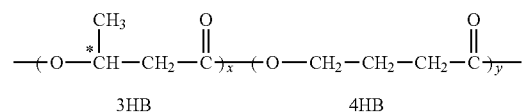

When 4-hydroxybutyric acid is used as the only carbon source for *Alcaligenes eutrophus*, P(3HB-co-34% 4HB) is produced with the content of 34% 4HB, while 4-hydroxybutyric acid in the presence of some additives is used as the carbon source for *Alcaligenes eutrophus*, P(3HB-co-4HB) copolyester with a large portion of 4HB (60-100 mol%) is produced. It has also been found that *Alcaligenes eutrophus* produces a random copolymer of P(3HB-co-4HB) with high efficiency in a one stage fermentation process by the usage of sucrose and 1,4-butyrolactone as the carbon source in a nitrogen free environment. The tensile strength of P(3HB-co-4HB) film decreases from 43 MPa to 26 MPa while its elongation increases from 4-444% with the increasing content of 4HB fraction. On the other hand, as the content of 4HB fraction increases from 64% to 100%, the tensile strength of the film increases from 17MPa to 104 Mpa with the increase of 4HB (Saito, Yuji, Shigeo Nakamura, Masaya Hiramitsu and Yoshiharu Doi, "*Microbial Synthesis and*

Properties of Poly(3-*hydroxybutyrate-co*-4-*hydroxybutyrate*)," Polymer International 39 (1996), 169-174). Some studies show that the degree of crystallinity of P(3HB-co-4HB) decreases from 55% to 14% as the content of 4HB fraction increases from 0 to 49 mol %, indicating that 4HB unit cannot crystallize in the sequence of 3HB unit and acts as the defect in the P(3HB) crystal lattice. This is probably largely responsible for the reduced brittleness and improved toughness of P(3HB-co-4HB) compared to P(3HB). Also the melting temperature is found to decrease from 178° C. to 150° C. as the content of 4HB fraction increases from 0 to 18 mol % (Kunioka, Masao, Akira Tamaki and Yoshiharu Doi, Crystalline and Thermal Properties of Bacterial copolyesters: Poly(3-hydroxybutyrate-co-3-hydroxvalerate) and Poly(3-hydroxybutyrate-co-4-hydroxybutyrate)," Macromolecules 1988, 22, 694-697). It has also been shown that the biodegradation rate is increased by the presence of 4HB unit in P(3HB-co-4HB) (Kunioka, Masao, Yasushi Kawaguchi and Yoshiharu Doi, "*Production of Biodegradable copolyesters of* 3-*hydroxybutyrate and* 4-*hydroxybutyrate by Alcaligenes eutropus,*" AppL Microbiol Biotechnol (1989) 30: 569-573). In another study, the enzymatic degradation of P(3HB-co-4HB) film is performed at 37° C. in a 0.1 M phosphate buffer of extracellular depolymerase purified from *Alcaligenes faecalis*. It is then found that the rate of enzymatic degradation notably increases with the increasing content of 4HB fraction and the highest rate occurs at 4HB of 28 mol % (Nakamura, Shigeo and Yoshiharu Doi, "*Microbial Synthesis and Characterization of Poly*(3-*hydroxybutyrate-co-*4*hydroxybutyrate*)," Macromolecules, 85 (17), 4237-4241, 1992).

This may be due to the resultant decrease in crystallinity; whereas, the presence of 4HB in excess of 85 mol % in the copolyester suppresses the enzymatic degradation (Kumaai, Y Kanesawa, and Y. Doi, Makromol. Chem., 1992, 193, 53 through Nakamura, Shigeo and Yoshiharu Doi, "*Microbial Synthesis and Characterization of Poly*(3-*hydroxybutyrate-co-*4*hydroxybutyrate*)," Macromolecules, 85 (17), 4237-4241, 1992). In a comparison of the biodegradation rates of P(3HB-co-9% 4HB), P(3HB) and P(HB-co-50% 3HV) films, the P(3HB-co-9% 4HB) is found to be completely degraded in activated sludge in two weeks with the degradation rate of this biopolyester being much faster than those of the other two. The degradation rate of P(3HB) is much faster than that of P(HB-co-50% 3HV) film (Kunioka, Masao, Yasushi Kawaguchi and Yoshiharu Doi, "*Production of Biodegradable copolyesters of* 3-*hydroxybutyrate and* 4-*hydroxybutyrate by Alcaligenes eutropus,*" Appl. Microbiol Biotechnol (1989) 30: 569-573).

Polybutylene adipate terephthalate (PBAT) is a biodegradable polymer which is currently synthesized from oil-based products rather than from bacteria. Although PBAT has a melting point of 120° C. which is lower than that of PLA, it has high flexibility, excellent impact strength and good melt processability. Furthermore, several studies about the biodegradation of PBAT film and molded product have indicated that significant biodegradation occurs in one year in soil, sea water and water with activated sludge. On contrary, even though PLA has good melt processability, strength and biodegradation/composting properties, it has both low flexibility and low impact strength. At this point, the flexibility, softness and impact strength of the final product can be improved by mixing PBAT with PLA. Some studies show that the least compatible blending ratio of PBAT and PLA is 50/50. However, it has been shown that miscibility and thus the mechanical property of a 50/50 blend of PBAT and PLA are improved by applying ultrasound energy to the melt blend with an ultrasonic device for 20 to 30 seconds. In this study, tensile strength is found to increase with increasing sonication time. Specifically, tensile strength reaches the highest value up to 20 seconds and then decreases after 20 seconds, whereas impact strength increases up to 30 seconds and then decreases over time after that point. However, sonicated system is found to have much higher impact strength than that of an un-sonicated system. It is explained that excess energy is consumed by the plastic deformation of PBAT phase in sonicated system, while propagating stress passes around the PBAT phases since they are immiscible and separated in the untreated system. This can be seen from a scanning electron microscopy (SEM) that, a minimum domain size of 4.7 μm is achieved after 30 seconds of sonication but notably increased with time afterwards. It is concluded that the excess energy leads to the flocculation of domain (Lee, Sangmook, Youngjoo Lee and Jae Wook Lee, "*Effect of Ultrasound on the Properties of Biodegradable Polymer blends of Poly*(*lactic acid*) *with Poly*(*butylene adipate-co-terephthalate*," Macromolecular Research, Vol. 15, No. 1, pp 44-50 [2007]). As pointed out above, PBAT has excellent elongation at break of above 500%. On contrary, the elongation at breaks are only 9% and 15% for PLA and PHBV ("*Biodegradable polyesters: PLA, PCL, PHA*". . . , http://www.biodeg.net/bioplastic.html). Therefore, in addition to increasing the flexibility, extensibility and softness of film, packaging material and fabric made by blending PBAT with PLA or PHA, a laminate with good extensibility can be produced by the lamination of PBAT film into elastic biodegradable or non-biodegradable fabrics. The chemical structure of PBAT is shown below:

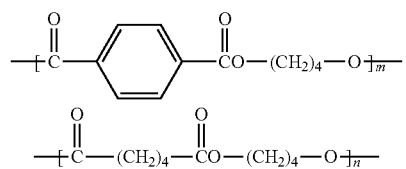

PBAT is available commercially from BASF as Ecoflex™, Eastman Chemical as Easter Bio®, and from Novamont of Italy as Origo-Bi®. DuPont is marketing a biodegradable aromatic copolyester known as Biomax®. However, rather than PLA, it is a modified polyethylene terephthalate) with a high content of terephtalic acid and a high temperature of about 200° C. Like PLA, Biomax® must firstly undergo hydrolysis before biodegradtion, which begins with small molecules being assimilated and mineralized by some microorganisms existed in the nature (Vroman, Isabelle and Lau Tighzert,"*Biodegradable Polymers,*" Materials 2009, 2, 307-344). In 2004, Novomont purchased the Eastar Bio copolyester business from Eastman chemical Company ("Novamont buys Eastman's Eastar Bio technology" http://www.highbeam.com/doc/1G1-121729929.html). BASF notes that its PBAT, Ecoflex™ is highly compatible with natural materials such as starch, cellulose, lignin, PLA and PHB ("*Bio-Sense or Nonsense,*" Kunstoffe International 8/2008 [Translated from Kunstoffe 8/2008, pp. 32-36).

Poly(butylenes succinate) PBS and its copolymer belong to the poly(alkenedicarboxylate) family. They are synthesized by polycondensation reaction of glycol (such as ethylene glycol and 1,4-butanediol) with aliphatic dicarboxylic acid (like succinic acid or adipic acid). They are marketed in Japan by Showa High Polymer as Bionolle® and in Korea by Ire Chemical as EnPol®. Different alkenedicarboxylates that have been produced are PBS, poly(ethylene succinate) (PES) and a copolymer prepared by the addition of adipic acid poly(butylene succinate-co-adipate) or PBSA. In addition, a copolymer made by the reaction of 1,2-ethylenediol and 1,4 butanediol with succinic and adipic acids has been marked in Korea by SK Chemical as Skygreen®. Another alipahatic copolyester sold by Nippon Shokubai of Japan is known as Lunare SE®. PBS is a crystalline polymer with a melting point of 90-120° C. and a glass transition temperature (Tg) of about −45° C. to −10° C. The PBS has the Tg value between those of polyethylene (PE) and polypropylene (PP), and it has similar chemical properties to those of PE and PP. Besides, the PBS has a tensile strength of 330 kg/cm$^2$ and an elongation-to-break of 330%, while its processibility is better than that of PLA (Vroman, Isabelle and Lau Tighzert,"*Biodegradable Polymers*," Materials 2009, 2, 307-344). The chemical structure of PBS is shown below:

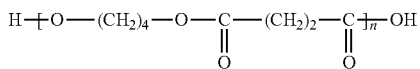

PBS consisted of succinic acid may also be produce by bacteria. At this point, bio-based succinic acid is used by Sinoven Biopolymers of China to produce PBS with a renewable content of 50%. It is reported that this kind of PBS has better performances than any other biodegradable polymers and has a heat resistance above 100° C. ("Production of Bio-based polybutylene succinate (PBS)", http://biopol.free.fr/index.php/production-of-biobased-polybutylene-succinate-pbs/). PBS is blended with PLA to improve flexural properties, heat distortion temperature, impact strength and gas permeability. Herein, PBS can be miscible with PLA and reduce the brittleness of PLA when the concentration of PBS is less than 20% (Bhatia, Amita, Rahul K Gupta, Sati N Bhattacharya and H. J. Choi, "*Compatibility of biodegradable poly (lactic acid) (PLA)and poly (butylenes succinate) (PBS) blends for packaging application*," Korea-Australia Rheology Journal, November 2007, Vol. 19, No. 3, pp. 125-131).

SUMMARY OF THE INVENTION

The technical problem to be solved in this invention is to provide biodegradable film and laminate which have extended shelf life in clean environment and accelerated degradation in dirty environment, aiming at the drawbacks that the degradation rate of the existing biodegradable material is low.

In this invention, the technical solution adopted to solve its technical problem is as follows: biodegradable film is constructed. This film comprises PHAs and PLA, wherein the content of PLA is 1%-95% in mass percent.

Blend of PHAs and PLA which enables enhanced biodegradation property is made of PHAs-PLA.

In a preferred embodiment of this invention, the product made from the blend of PHAs and PLA has extended shelf life in clean environment.

In a preferred embodiment of this invention, the product made from the blend of PHAs and PLA can be configured for producing film, container for solid and liquid, rigid or flexible package, woven, knitted and non-woven fabric with filament and staple fiber, and composite product of fabric and film through thermal forming, injection molding or melt spinning In a preferred embodiment of this invention, non-woven fabrics made by melt spinning comprise spunbond and meltblown non-woven fabrics.

In a preferred embodiment of this invention, non-woven fabrics bonded by wet adhesive or dry adhesive include carding and air laying.

In a preferred embodiment of this invention, non-woven fabrics are bonded by wet adhesive such as latex or dry adhesive such as thermal bonding power or fiber.

In a preferred embodiment of this invention, non-woven fabrics are obtained by needlepunching, hydroentangling, thermal calendaring, hot air through-air thermal bonding or the following heating processes including microwave, ultrasonic wave, welding, far infrared heating and near infrared heating.

In a preferred embodiment of this invention, the fabrics comprise the laminates made by spunbond, spunbond-spunbond, spunbond-meltblown and spunbond-meltblown-spunbond which can be used for industrial protective clothing, medical protective clothing such as hospital operating room drape and gown fabric, sterile instrument wrap, patient lifting sling and patient stretcher.

In a preferred embodiment of this invention, composite fabric is the laminate of film and fabric which is made in combination with other non-woven production processes such as spun laying, needlepunching and air laying of pulp or fiber as well as hydroentangling.

In a preferred embodiment of this invention, the laminate includes meltblown air filter media, meltblown liquid filter media and spunbond or other types of non-woven fabrics as outer and inner facings, wherein the facings only need to be sewn or thermally or ultrasonically bonded on their edges.

In a preferred embodiment of this invention, the composites include MB PLA and blend of MB PLA with PHAs and with cellulosic fiber, such as pulp, short cotton fiber or other manmade or natural fibers added to the meltblown fiber stream or in layers between MB layers.

In a preferred embodiment of this invention, the PHAs are PHBs or PHVs, or a copolymer or blend of PHBs and PHVs.

In a preferred embodiment of this invention, the PHBs are P(3HB-co-4HB) polymerized by 3HB and 4HB.

In a preferred embodiment of this invention, the mole percent of 4HB ranges from 5% to 85%.

In a preferred embodiment of this invention, the percentage of PLA in dry blend or in composite and melt extruded blend of PHAs range from 1% PLA to 95% PLA, preferably at or below 50% PLA and most preferably at or below 30% PLA (50%-10%).

In a preferred embodiment of this invention, biodegradable and compostable woven, knitted and non-woven fabrics as well as film product have improved mechanical properties, elongation-to-break, flexibility and impact resistance when the blend of PBAT and PLA include PBAT of 5-60% and preferably PBAT of 20-40%.

In a preferred embodiment of this invention, biodegradable and compostable woven, knitted and non-woven fabrics as well as film product have improved mechanical properties, elongation-to-break, flexibility and impact resistance when the blend of PBS and PLA include PBS of 5-40% and preferably PBS of 10-40%.

In a preferred embodiment of this invention, biodegradable and compostable woven, knitted and non-woven fabrics as well as film product have improved mechanical properties, elongation-to-break, flexibility and impact resistance when the blend of PBAT, PBS and PLA include PBAT of 5-50% and PBS of 5-40%, and preferably include PBAT of 10-30% and PBS of 10-40%.

In a preferred embodiment of this invention, PBAT film has improved strength, decreased thermal shrinkage and lower cost by blending with 10-60% PLA and preferably with 20-40% PLA.

In a preferred embodiment of this invention, PBAT film has improved strength, decreased thermal shrinkage and lower cost by blending with 10-60% PBS and preferably with 20-40% PBS.

In a preferred embodiment of this invention, PBAT film has improved strength, decreased thermal shrinkage and lower cost by blending with 10-40% PLA and 10-40% PBS, and preferably with 15-30% PLA and 15-30% PBS.

In a preferred embodiment of this invention, the preceding biodegradable and compostable woven, knitted and non-woven fabrics and film product have reduced cost when blended with fillers such as starch and calcium carbonate in amounts ranging from 5 to 60% and preferably from 10 to 40%.

In a preferred embodiment of this invention, the preceding biodegradable and compostable PBAT film has reduced cost when blended with fillers such as starch and calcium carbonate in amounts ranging from 5 to 60% and preferably from 10 to 40%.

In a preferred embodiment of this invention, knitted, woven or non-woven fabrics made of PLA by addition of fillers such as starch and calcium carbonate in amounts ranging from 5 to 60% and preferably from 10 to 40% are lower in cost.

In a preferred embodiment of this invention, knitted, woven and non-woven fabrics made of blends of PLA and PHA by addition of fillers such as starch and calcium carbonate in amounts ranging from 5 to 60% and preferably from 10 to 40% are lower in cost.

In a preferred embodiment of this invention, films made of PBS by addition of fillers such as starch and calcium carbonate in amounts ranging from 5 to 60% and preferably from 10 to 40% are lower in cost.

In a preferred embodiment of this invention, the preceding biodegradable and compostable fabrics can be laminated to obtain laminate.

In a preferred embodiment of this invention, laminates consisted of the respective biodegradable and compostable fabrics can be adhesively bonded through biodegradable glue or heat-melt adhesive.

In a preferred embodiment of this invention, the fabrics are used as crop mulch films to suppress weed growth, enhance moisture control, increase soil temperature and reduce fertilizer leaching.

In a preferred embodiment of this invention, the films are used as crop mulch films to suppress weed growth, enhance moisture control, increase soil temperature and reduce fertilizer leaching.

In a preferred embodiment of this invention, the fabric and film laminates may be used as crop mulch films to suppress weed growth, enhance moisture control, increase soil temperature and reduce fertilizer leaching.

In a preferred embodiment of this invention, the preceding laminates may be used for patient lifting slings and patient stretchers.

In a preferred embodiment of this invention, the laminates may be used in disposable diapers and feminine sanitary napkins.

In a preferred embodiment of this invention, the laminates are made of PBAT-based film and elastomer meltblown or spunbond non-woven fabric; the elastomer meltblown or spunbond non-woven fabric is made of ExxonMobil Vistamaxx® containing 100% Vistamaxx or blends of 60-95% Vistamaxx with other polymers such as polypropylene (PP).

In a preferred embodiment of this invention, the laminates are made of PBAT-based film and elastomer meltblown or spunbond non-woven fabric; the elastomer meltblown or spunbond non-woven fabric is made of ExxonMobil Vistamaxx® containing 100% Vistamaxx or blends of 60-95% Vistamaxx with other polymers such as polypropylene (PP). Herein, the laminates are bonded with glue or hot-melt adhesives.

In a preferred embodiment of this invention, the laminates are made of PBAT-based film and elastomer meltblown or spunbond non-woven fabric; the elastomer meltblown or spunbond non-woven fabric is made of ExxonMobil Vistamaxx® containing 100% Vistamaxx or blends of 60-95% Vistamaxx with other polymers such as polypropylene (PP). Herein, the laminates are thermally bonded.

In a preferred embodiment of this invention, the laminates are made of PBAT-based film and elastomer meltblown or spunbond non-woven fabric; the elastomer meltblown or spunbond non-woven fabric is made of ExxonMobil Vistamaxx® containing 100% Vistamaxx or blends of 60-95% Vistamaxx with other polymers such as polypropylene (PP). The PBAT film is extrusion-coated on the Vistamaxx.

This invention discloses enhanced biodegradable fabric and laminate which may be produced by laminating biodegradable film. The biodegradable film may primarily consist of polybutylene adipate terephthalate (PBAT) or polybutylene succinate (PBS) or blends of PBAT and PBS with polylactic acid (PLA) and other biodegradable polymers such as polybutylene succinate adipate (PBSA), polycaprolactone (PCL), polycaprolactone butylene succinate (PCL-BS) and polydyroxyalkonates (PHA), in which case PLA, novel blends of PLA with PHAs, or blends of PLA with PBAT and PBS, or blends of PLA and PHAs with PBAT and PBS or other biodegradable polymers is made therefrom. These novel fabrics and laminates have enhanced biodegradation in environments containing microorganisms while possessing good shelf-life and good strength, flexibility and pliability. The fabric substrate to be laminated may be woven, knitted or non-woven fabric. The biodegradable films may be produced by blown film process, cast film process, thermoforming, vacuum forming or extrusion coating. In the extrusion coating of the film onto the fabric, an adhesive which is needed in most of other processes is not usually required. However, it is necessary to adhere the film to the fabric with an adhesive or hot melt which may also be biodegradable.

DETAILED DESCRIPTION OF THE PREFERRED EMBODIMENT

Although the biodegradation of P(3HB-co-4HB) product is easy to occur in soil, sludge and sea water, the biodegradation rate in water in the absence of microorganisms is still very slow (Saito, Yuji, Shigeo Nakamura, Masaya Hiramitsu and Yoshiharu Doi, "*Microbial Synthesis and Properties of Poly(3-hydroxybutyrate-co-4-hydroxybutyrate)*," Polymer International 39 (1996), 169-174). Thus, the shelf life of P(3HB-co-4HB) product in clean environment such as dry storage in sealed package or in clean wipes cleansing solution etc. is very good. However, when located in dirty environments containing microorganisms such as soil, river water, river mud, compost of manure and sand, sludge and sea water, the disposed P(3HB-co-4HB) fabric, P(28.56-cooperative hydroxybutyrate) fabric, film and packaging material are easy to degrade. It should be pointed out that polylactic acid (PLA) is easy to be composed instead of being degraded in the dirty environments above. Heat and moisture in the resulting compost pile must firstly break the PLA polymer into smaller polymer chains which finally degrade to lactic acid. After that, microorganisms in the compost and soil consume the smaller polymer fragments and lactic acid as the nutrients.

Accordingly, the mixing of hydroxybutyrate with PLA may accelerate the degradation rate of blend product made from PHAs-PLA such as P(3HB-co-4HB). Furthermore, product made by mixing PHAs with PLA has extended its shelf life in clean environment. Although the price of PLA has decreased substantially over the past 10 years to just a little more than that of synthetic polymers such as polypropylene and PET polyester, the price of PHAs still remains two to three times higher than that of PLA. This is because PLA is synthesized on a large scale from lactic acid, while PHAs are produced by bacteria with specific carbon source and have to be extracted from the bacteria with a solvent. Therefore, it is not commercially feasible to mix more than 25% PHA with PLA to melt extrude products such as woven and knitted fiber, nonwoven fabric, film, food packaging container, etc.

Four groups of sample solution formulations are listed in tables 1-4, which are formulations for 400 Kg of clean wipes cleaning solution (typically the liquid contained in package of baby wipes); river water collected from the East River in Dongguan of China with some river mud; river mud collected from the East River in Dongguan of China; and a mixed compost of silt, sand and cow manure, respectively. The above-mentioned starting materials are mixed with distilled water and the resulting mixture is adjusted to a pH value of above 7 with dilute KOH. Two sample solutions with identical formulation are used for each treatment. Each of the treatment boxes containing the samples exposed to the treatment is covered and the pH value and percentage of solid are determined every two weeks. Average results in the first 4 weeks of exposure are shown in Table 5.

In one embodiment of this invention, two blends of PLA and PHB, i.e. 25 Kg of blend of 85% PLA (NatureWorks 2002D) and 15% PHB (3HB-co-4HB) as well as 25 Kg of blend of 75% PLA (NatureWorks 2002D) and 25% PHB (3HB-co-4HB) are melt blended and extruded as pellets that are then shipped to Biax-Fiberflilm Corporation, Greenville, Wis., USA. Those pellets are melt spun to produce meltblown (MB) fabric with a basis weight of 50 g/m². For the purpose of comparative test, MB fabric of 100% PLA (Nature Works 2002D) is also produced. During the MB process of these polymers, it becomes increasingly obvious that melting and hot air temperature used to prepare the MB fabric are too high since the 2002D PLA polymer has a very low melt index (indicating a very high molecular weight of PLA) and it requires higher temperature to increase the fluidity of MN PLA for its smooth extrusion through the meltblown die orifice. The melting temperature of 100% 2002D PLA is 274° C. and the hot air temperature is 576° C. On contrary, a melting temperature of 266° C. and a hot air temperature of 260° C. are generally applied for melt spinning spunbond grade PLA with a melt index of 70-80 (Wadsworth, Larry and Doug Brown, "*High Strength, High Quality Meltblown Insulation, Filters and Wipes with Less Energy*" Presentation to Guangdong Nonwovens Association Conference, Dongguan, China, Nov. 26-27, 2009). Therefore, owing to such two blends, the PHB component contained apparently undergoes some thermal degradation, which is evidenced by much smoke coming from the extruded MB fiber and the low strength of the produced MB PLA/PHB fabric. In the following experiments, it is scheduled that PLA polymer (NatureWorks PLA 6251 D) with higher melt index (which is 70-85 and requires for much lower MB processing temperature) is employed to be mixed with PHB in the same ratio. In addition, similar composition using the 6251D PLA is scheduled to be made on a 1-meter spunbond non-woven pilot line. This typically operates at a temperature that is only a little above the melting point of the PLA and the blended PLA-PHB polymer so that even less thermal degradation occurs. This is because a filament drafting step absent from the MB process is adopted in the SB process, and thus the produced filament is obviously larger than that produced from the same polymer. Compared to the MB fabric with a diameter of 2-8 μm, the average diameter of the fiber in SB fabric is typically 12-25 μm. The second MB operation and SB operation of these polymer compositions will reduce the thermal degradation effect to a maximum extent, and thus the degradation observed in the biodegradation process is mainly from biodegradation. Also, since the MB and SB non-woven fabrics have large differences in their diameters, the smaller MB fiber has more surface area and is expected to undergo biodegradation more readily and more quickly.

The MB 100% 2002D MB fabric, the 85% 2002D PLA/15% PHB and the 75% 2002D/25% PLA rolled to have a width of 12.5 inch and a density of 50 g/m² are shipped from Biax-Fiberfilm Company back to U.S. Pacific Nonwovens & Technical Textile Technology (DongGuan) Limited which is located at No.2 East Dyke, Aozhitang Industrial Park in Dongcheng District, Dongguan of Guangzhou Province of China and subordinate to U.S. Pacific Nonwovens Industry. Herein, 1.5 meter of each fabric is immersed with different treatment methods and then left exposed to different treatment fluids together with samples to be removed from each treatment box, while the corresponding repeated treatments are carried out at intervals of 4 weeks, 8 weeks, 12 weeks, 16 weeks and 20 weeks.

Below is the specific experiment process. First of all, MB PLA and PLA-PHB fabrics added with clean wipes cleaning solution are stored in a porous steel basket and further exposed in the treatment box. After four weeks' treatment, MB sample in compost is gently washed in a nylon stocking. Thereafter, corresponding degradation conditions can be observed after washing and drying. Some river water is applied to the MB fabric in the same manner as that of the clean wipes cleaning solution. Then the MB fabric is placed in the porous steel basket in the covered treatment box until samples of the 100% MB PLA, 85% PLA-15% PHB, and 75% PLA-25% PHB are removed from all of the treatment boxes at an interval of 4 week increments up to a total of 20 weeks. In the case of river mud and silt/sand/manure compost, the fabric to be exposed thereto is first laid onto the treatment box while being immersed and thoroughly penetrated by the treatment solution. Subsequently, the fabric is inserted into a nylon panty hose stocking with one half of a 1.5-meter sample being placed into one leg and the other half into the other leg. The stocking containing the fabric is then gently pulled over the sample and buried into the proper box containing some river mud or compost. Besides, the treatment box is attached with a label by a nylon string for each stocking. The fabric samples removed every 4 week are laid onto a metal box with a wire screen on the bottom. In this case, a nylon knitted fabric is placed on top of the wire mesh, and the treated fabric is gently washed by applying some low pressure water onto the palm. Then a second nylon knitted fabric is placed on top of the washed sample and the fabric is gently turned over to wash the other side. Finally, all of the washed and treated fabrics are placed on a laundry drying table and dried over two days until dry before being taken to the laboratory for test. A portion of each of the treated and dried fabrics is sent to an external laboratory for scanning electron microscopy analyses to determine the extent of fiber breakage as an experimental result of the treatment process. In addition, gel permeation chromatography is adopted to determine if some changes and presumable loss in molecular weight of the polymer occur during exposure to the different treatments, and differential thermal analysis is adopted to determine any changes in crystalline phase. After four weeks' different treatments, test results for physical property of the fabrics are shown in tables. Herein, table 6A is specific to 100% 2002D PLA MB fabric, table 7A to 85% 2002D PLA/15% PHB MB sample, and table 8A to 75% 2002D/25% PHB fabrics. The 100% MB PLA sample loses 6% of the machine direction (MD) tensile strength after exposure in the clean wipes cleaning solution for 4 weeks, while the 85%PLA/15% PHB and 75%PLA/PHB fabrics only lose 4% and 1% of the machine direction (MD) tensile strength, respectively, in the clean wipes cleaning solution. However, all of the 100% PLA, 85% PLA/15% PHB and 75% PLA/25% PHB lose 50%, 32% and 65% of cross machine direction (CD) trapezoid tearing strength, respectively. After 4 weeks in the river water, 100% MB PLA loses 26% of MD tensile strength and 64% of CD tearing strength, and the 85% PLA/15% PHB and 75% PLA/25% PHB lose 19% and 22% of MD tensile strength and 77% and 80% of CD tearing strength, respectively. After 4 weeks in the river mud, the 100% PLA fabric loses 91% of MD tensile strength and 98% of CD tearing strength, and the 85% PLA/15% and 75% PLA/25% PHB lose 76% and 75% of MD tensile strength and 96% and 87% of CD tearing strength, respectively. After 4 weeks in the silt/sand/cow compost, the 100% PLA loses 94% of MD tensile strength and 99% of CD tearing strength, and the 85% PLA/15% PHB and 75% PLA/25% PHB lose 76% and 86% of MD tensile strength and 99% and 83% of CD tearing strength, respectively. The air permeability of all the samples exposed to the river mud and compost increases, which causes higher air permeability value and indicate more open structures with the increase of biodegradation. Less increase in air permeability is caused to the MB 100% PLA fabric when compared with the PLA-PHB blend fabric under different treatments. Besides, none of the fabrics loses any weight and in fact some gain weight since it is difficult to remove all of the treatment debris from the samples without causing further damage to the fabrics.

The exposure effects in different treatments for 12 weeks of the 100% 2002D PLA MB fabric, 85% PLA/15% PHB, and 75% PLA/25% PHB are shown in Tables 6B, 7B, and 8B, respectively. After these fabrics have been stored on a roll wrapped in plastic for 16 weeks, the 85% PLA/15% PHB are not notably low in MB and CD tenacity after 16 weeks storage, while the 75% PLA/25% PHB shows 22% loss in MD tenacity and 33% loss in CD tenacity. As what is found after 4 weeks of exposure to different treatments, after 12 weeks of exposure, MD and CD tenacities compared to those of the corresponding domestic fabrics are higher in the clean wipes solution with 100% PLA as compared to two blends of PLA and PHB. All of the samples show appreciable degradation in river water, river mud and silt/sand/manure compost after 12 weeks.

TABLE 1

Formulation for Clean Wipes Cleaning Solution Loaded in Two Different Boxes

| Ingredient | Weight Percentage (%) | Weight (Kg) |
|---|---|---|
| Purified Water | 97.56 | 390.24 |
| Propylene Glycol | 1.2 | 4.8 |
| Lanolin | 0.6 | 2.4 |
| Cocoamphodiacte | 0.3 | 1.2 |
| Polysorbate-20 | 0.1 | 0.4 |
| Ethylparaben | 0.0167 | 0.0668 |
| Methylparaben | 0.0167 | 0.0668 |

TABLE 1-continued

Formulation for Clean Wipes Cleaning Solution Loaded in Two Different Boxes

| Ingredient | Weight Percentage (%) | Weight (Kg) |
|---|---|---|
| Propylparaben | 0.0167 | 0.0668 |
| Benzalkonium Chloride | 0.075 | 0.3 |
| Disodium EDTA | 0.075 | 0.3 |
| Citric Acid | 0.01 | 0.04 |
| aromatic hydrocarbon | 0.03 | 0.120 |
| Total | 100.0 | 400 Kg (approx. 400 L) |

TABLE 2

Composition of River Water in Each of Two Boxes

| Ingredient | Weight (Kg) |
|---|---|
| River Water | 380 |
| River Mud | 20 |
| Total | 400 Kg |

TABLE 3

Composition of River Mud in Each of Two Boxes

| Ingredient | Weight (Kg) |
|---|---|
| River Mud | 300 |
| River Water | 100 |
| Total | 400 |

TABLE 4

Weight Compositions of Silt, Sand, Cow Manure and Distilled Water in Each of the Two Boxes

| Ingredients | Weight percentage (%) | Weight (Kg) |
|---|---|---|
| Silt | 23 | 69 |
| Sand | 23 | 69 |
| Cow Manure | 23 | 69 |
| Distilled Water | 31 | 93 | pH value is adjusted to 7.5 by 10% Potassium Hydroxide.
(Weight of KOH is included in the composition of distilled water.)

| Total | 100 | 300 Kg |

Illustration of Table 4:

69 Kg of dry silt (obtained from river by USP gardener) is added to a large mixing container;

69 Kg of dry cow manure is added, which has already been broken up into small pieces by a large electric mixer;

69 Kg of dry sand is added slowly during mixing operation;

83 Kg of distilled water is added slowly during stirring operation;

In the case of complete mixing, pH value is detected by a litmus paper or a pH meter. 10% potassium hydroxide (prepared in distilled water) is added slowly until the pH value reaches 7.5.

Remaining amount of distilled water is added so that the water containing calcium hydroxide accounts for 93 Kg in total. pH value is checked and further adjusted to 7.5.

TABLE 5 pH Value and Percentage of Solids in Treatment Boxes for Biax
MB PLA (2002D) and MB PLA (2002D) Blended with 15% and 25% PHB

|  | pH value | | | Percentage of solid | | |
|---|---|---|---|---|---|---|
| Treatment | First | Replication | Average | First | Replication | Average |
| Clean wipes Cleaning Solution | 3.92 | 3.94 | 3.93 | 1.30 | 1.32 | 1.31 |
| River Water | 6.89 | 6.98 | 6.94 | 0.13 | 0.14 | 0.14 |
| River Mud | 7.19 | 7.18 | 7.18 | 51.8 | 50.4 | 51.1 |
| Silt/Sand/Manure Compost | 7.36 | 7.51 | 7.44 | 52.4 | 54.6 | 53.5 |

TABLE 6A

Weight, Thickness, Air Permeability and Strength Properties of 100% PLA (2002D)
at post-production and after Exposure for Four Weeks to Clean Wipes Cleaning
Solution, River Water, River Mud and Silt/Sand/Manure Compost

| | 100% PLA 2002D after 4 Weeks | | | | | | | | |
|---|---|---|---|---|---|---|---|---|---|
| | Weight | Thickness | Air Perm. | Tenacity (N) MD | | CD | Elongation (%) MD | CD | Tearing Strength (N) CD | |
| | (g/m$^2$) | (mm) | (l/m$^2$·s) | | % Loss | | | | | % Loss |
| Post-production | 46.4 | 0.400 | 2122 | 31.8 | | 14.0 | 10.1 | 57.2 | 22.1 | |
| Clean wipes Cleaning Solution | 47.2 | 0.366 | 2298 | 29.9 | 6 | 12.8 | 6.8 | 29.8 | 11.0 | 50 |
| River Water | 45.8 | 0.384 | 2260 | 23.6 | 26 | 9.8 | 3.2 | 3.8 | 8.0 | 64 |
| River Mud | 49.2 | 0.394 | 2672 | 3.0 | 91 | 1.2 | 3.0 | 1.2 | 0.4 | 98 |
| Silt/Sand/Manure Compost | 56.8 | 0.472 | 2506 | 1.8 | 94 | 0.6 | 0.7 | 0.4 | 0.2 | 99 |

TABLE 7A

Weight, Thickness, Air Permeability and Strength Properties of 85% PLA (2002D)/15%
PHB at post-production and after Exposure for Four Weeks in Clean Wipes Cleaning
Solution, River Water, River Mud and Silt/Sand/Manure Compost

| | 85% PLA/15% PHB after 4 Weeks | | | | | | | | |
|---|---|---|---|---|---|---|---|---|---|
| | Weight | Thickness | Air Perm | Tenacity (N) MD | | CD | Elongation (%) MD | CD | Tearing Strength (N) CD | |
| | (g/m$^2$) | (mm) | (l/m$^2$·s) | | % Loss | | | | | % Loss |
| Post-production | 57.8 | 0.455 | 3134 | 14.4 | | 9.7 | 19.8 | 32.9 | 7.9 | |
| Clean wipes Cleaning Solution | 52.5 | 0.536 | 3876 | 13.8 | 4 | 9.4 | 13.5 | 21.3 | 3.4 | 57 |
| River Water | 58.8 | 0.460 | 3024 | 11.6 | 19 | 7.2 | 4.2 | 7.0 | 1.8 | 77 |
| River Mud | 63.2 | 0.531 | 3639 | 3.4 | 76 | 2.2 | 2.7 | 3.4 | 0.3 | 96 |
| Silt/Sand/Manure Compost | 59.8 | 0.508 | 3916 | 3.5 | 76 | 1.4 | 3.6 | 3.6 | 0.1 | 99 |

TABLE 8A

Weight, Thickness, Air Permeability and Strength Properties of 75% PLA (2002D)/25% PHB at Post-production and after Exposure for Four Weeks in Clean Wipes Cleaning Solution, River Water, River Mud and Silt/Sand/Manure Compost

| | 75% PLA/25% PHB after 4 Weeks | | | | | | | | | |
|---|---|---|---|---|---|---|---|---|---|---|
| | Weight | Thickness | Air Perm | Tenacity (N) MD | | | Elongation (%) | | Tearing Strength (N) CD | |
| | (g/m²) | (mm) | (l/m²·s) | | % Loss | CD | MD | CD | | % Loss |
| Post-production | 53.8 | 0.387 | 3740 | 8.5 | | 3.6 | 5.2 | 12.0 | 3.7 | |
| Clean wipes Cleaning Solution | 56.2 | 0.344 | 3708 | 8.4 | 1 | 3.8 | 2.5 | 4.4 | 1.3 | 65 |
| River Water | 53.6 | 0.338 | 3627 | 6.6 | 22 | 2.4 | 1.6 | 1.8 | 0.74 | 80 |
| River Mud | 53.7 | 0.403 | 4502 | 2.1 | 75 | 0.8 | 2.6 | 2.6 | 0.48 | 87 |
| Silt/Sand/Manure Compost | 61.5 | 0.460 | 5448 | 1.2 | 86 | 0.8 | 3.6 | 9.1 | 0.62 | 83 |

TABLE 6B

Weight, Thickness, Air Permeability and Strength Properties of 100% PLA (2002D) MB Wet Wipes at Post-production After 3 and 16 Weeks and After Exposure for 12 Weeks in Clean Wipes Solution, River Water, River Mud and Silt/Sand/Manure Compost

| | 100% PLA 2002D After 12 Weeks | | | | | | | | | | |
|---|---|---|---|---|---|---|---|---|---|---|---|
| | Weight | Thickness | Air Perm | Tenacity (N) MD | | CD | | Elongation (%) | | Tearing Strength (N) CD | |
| | (g/m²) | (mm) | (l/m²·s) | | % Loss | | % Loss | MD | CD | | % Loss |
| Post-production after 3 Weeks | 46.4 | 0.400 | 2122 | 31.8 | | 14.0 | | 10.1 | 57.2 | 22.1 | |
| Post-production after 16 Weeks | 44.8 | 0.396 | 2079 | 32.2 | 0 | 12.7 | 9 | 7.0 | 45.4 | 9.8 | 56 |
| Clean Wipes Solution | 46.7 | 0.41 | 2328 | 14.5 | 54 | 3.8 | 73 | 1.2 | 1.0 | 2.3 | 90 |
| River Water | 46.6 | 0.392 | 2272 | 4.9 | 85 | 2.4 | 83 | 0.6 | 0.7 | 0.8 | 96 |
| River Mud | 49.2 | 0.408 | 2652 | 0.6 | 98 | 0.2 | 99 | 0.9 | 0.2 | 0.3 | 99 |
| Silt/Sand/Manure Compost | * | * | * | * | * | * | * | * | * | * | * |

* Samples are too disintegrated to perform physical testing.

TABLE 7B

Weight, Thickness, Air Permeability and Strength Properties of 85% PLA (2002D)/15% PHB at Post-production After 3 and 16 Weeks and After Exposure for 12 Weeks in Clean Wipes Solution, River Water, River Mud and Silt/Sand/Manure Compost

| | 85% PLA/15% PHB After 12 Weeks | | | | | | | | | | |
|---|---|---|---|---|---|---|---|---|---|---|---|
| | Weight | Thickness | Air Perm | Tenacity (N) MD | | CD | | Elongation (%) | | Tearing Strength (N) CD | |
| | (g/m²) | (mm) | (l/m²·s) | | % Loss | | % Loss | MD | CD | | % Loss |
| Post-production after 3 Weeks | 57.8 | 0.455 | 3134 | 14.4 | | 9.7 | | 19.8 | 32.9 | 7.9 | |
| Post-production for 16 weeks | 54.9 | 0.441 | 3049 | 15.0 | 0 | 9.5 | 2 | 19.2 | 31.5 | 7.1 | 10 |
| Clean Wipes Solution | 60.6 | 0.576 | 3418 | 10.0 | 31 | 5.4 | 44 | 4.2 | 8.0 | 2.3 | 71 |

TABLE 7B-continued

Weight, Thickness, Air Permeability and Strength Properties of 85% PLA (2002D)/15% PHB at Post-production After 3 and 16 Weeks and After Exposure for 12 Weeks in Clean Wipes Solution, River Water, River Mud and Silt/Sand/Manure Compost

| | 85% PLA/15% PHB After 12 Weeks | | | | | | | | | |
|---|---|---|---|---|---|---|---|---|---|---|
| | Weight | Thickness | Air Perm | Tenacity (N) MD | | CD | | Elongation (%) | | Tearing Strength (N) CD |
| | (g/m²) | (mm) | (l/m² · s) | | % Loss | | % Loss | MD | CD | % Loss |
| River Water | 61.4 | 0.506 | 2853 | 8.5 | 41 | 6.3 | 35 | 5.6 | 11.4 | 2.2 72 |
| River Mud | 66.9 | 0.522 | 3020 | 2.5 | 83 | 1.9 | 80 | 2.1 | 2.7 | 0.6 92 |
| Silt/Sand/Manure Compost | 62.6 | 0.490 | 3152 | 2.5 | 83 | 3.2 | 67 | 2.4 | 4.8 | 1.1 86 |

*Samples are too disintegrated to perform physical testing.

TABLE 8B

Weight, Thickness, Air Permeability and Strength Properties of 75% PLA (2002D)/25% PHB at Post-production d After 3 and 16 Weeks and After Exposure for 12 Weeks in Clean Wipes Solution, River Water, River Mud and Silt/Sand/Manure Compost

| | 75% PLA/25% PHB After 12 Weeks | | | | | | | | | |
|---|---|---|---|---|---|---|---|---|---|---|
| | Weight | Thickness | Air Perm | Tenacity (N) MD | | CD | | Elongation (%) | | Tearing Strength (N) CD |
| | (g/m²) | (mm) | (l/m² · s) | | % Loss | | % Loss | MD | CD | % Loss |
| Post-production after 3 Weeks | 53.8 | 0.387 | 3740 | 8.5 | | 3.6 | | 5.2 | 12.0 | 3.7 |
| Post-production after 16 Weeks | 55.5 | 0.383 | 3339 | 6.6 | 22 | 2.4 | 33 | 1.5 | 1.6 | 1.5 59 |
| Clean Wipes Solution | 56.8 | 0.376 | 3838 | 4.6 | 46 | 1.9 | 47 | 1.4 | 2.2 | 0.7 81 |
| River Water | 46.8 | 0.346 | 3182 | 4.4 | 48 | 1.4 | 61 | 0.9 | 0.6 | 0.5 86 |
| River Mud | 57.4 | 0.440 | 5129 | 1.1 | 87 | 1.1 | 69 | 2.0 | 2.9 | 0.7 81 |
| Silt/Sand/Manure Compost | * | * | * | * | * | * | * | * | * | * * |

* Samples are too disintegrated to perform physical testing.

In addition to the biodegradation studies described above, pure PBAT films in a thickness of 9 micron (μm) with or without 20% calcium carbonate are obtained from a vendor in China. Meltblown (MB) Vistamaxx® containing 20% PP is obtained from Biax-Fiberfilm Corporation in Neenah, Wis., USA. Spunbond (SB) PLA pigmented black with carbon black with a nominal weight of 80 g/m² is obtained from Saxon Textile Research Institute in Germany. The pure PBAT film and PBAT film with 20% calcium carbonate are laminated in separate trials to Vistamaxx MB containing 20% PP and black SB PLA using hot-melt adhesive of 5-13 g/m². At this point, hot-melt adhesive generally of 0.5-12 g/m² and preferably of 1-7 g/m² are adopted. In addition, two layers of SB PLA are laminated and adhered using hot-melt adhesive. All of the raw materials and laminates are tested as shown in Table 9 for weight, thickness, tenacity, elongation-to-break, tearing strength, bursting strength, water vapor transmission rate (WVT) and hydrohead. It should be pointed that these are only some samples of different embodiments of this invention and that in addition to using a hot-melt technology to adhere different layers of the materials below together, the PBAT films or other biodegradable/compostable films can be directly applied to the substrates by extrusion coating without the necessary adoption of an adhesive. The laminate can be joined or bonded together by a portion of technologies listed below such as thermal point calendaring, overall-calendering or ultra-sonic welding. Furthermore, instead of a hot-melt adhesive, glue, or water or solvent-based adhesives or latexes can be used to adhere the laminates together.

As shown in Table 9, the 9 μm pure (100%) PBAT film (sample 1) has good elongation in the MD direction and very high elongation of over 300% in the CD. The bursting strength test cannot be performed on samples 1 through 5 because all of these samples are so elastic that the films and laminates do not rupture during the test and appeared free of deformation after the test. The water vapor transmission rate of sample 1 is rather high at 3380 g/m²/24 hours as was the hydrostatic head at 549 mm. The PBAT film containing 20% calcium carbonate ($CaCO_3$) (sample 2) has similar properties as sample 1 with the same WVTR and lower hydrohead. PBAT film similar to samples 1 and 2 with a smaller thickness of 6 μm or less would also be expected to have good elongation and higher WVTR, although its hydrohead may be lower. The meltblown (MB) sample 3, containing 80% Vistamaxx® (Vistamaxx polyolefin-based polymer high in elasticity and produced by ExxonMobil) and 20% PP has a very high MD and CD elongation of about 300% and a very high WVTR of 8816 g/m²/24 hours when the fabric is fairly open. However, the hydrohead of sample 3 is rather high at 1043 mm, which indicates it still has good barrier properties. It should be pointed that 20% PP is added to the Vistamaxx polymer pellets and physically mixed before the blend is fed into an MB extruder and melted so that the Vistamaxx MB fabric will not be too sticky. If 100% Vistamaxx is meltblown, it will be very sticky, block on the roll and be difficult to un-wind for lamination or use later. Nevertheless, it is most feasible to meltblow 100% Vistamaxx if the MB Vistamaxx is laminated in-line with a film such as PBAT or PBS with or without $CaCO_3$ or to another non-woven, scrim or fabric. In fact it may not be necessary to use an adhesive since 100% Vistamaxx or a higher concentration of Vistamaxx is already very sticky.

Compared to the unique adoption of Vistamaxx, the lamination of the pure PBAT and PBAT containing 20% $CaCO_3$ with Vistamaxx using a hot-melt adhesive notably increases the MD and CD tenacity. These samples also have very high MB elongation and particularly high CD elongation (390% for sample 4 and 542% for sample 5). Also, samples 4 and 5 have notably high MVTR values of 1671 and 1189 g/m²/24 hours and high hydroheads of 339 and 926 mm $H_2O$, respectively. Again it should be pointed that the PBAT films can be extrusion-coated directly onto MB 100% Vistamaxx or onto MB Vistamaxx with some PP with or without the use of a hot-melt adhesive, and the extrusion-coating process can allow a much thinner PBAT film to be used, possibly as low as 4 or 5 µm, with a resulting higher MVTR but with possibly lower hydrohead.

The black SB PLA with a target weight of 80 g/m² has a MD tenacity of 104 N and a CD tenacity of 31 N, while its MD elongation is low to be 3.6% and CD elongation is high to be 30.7%. Its busting strength is 177 KN/m², the WVTR is rather high at 8322 g/m²/24 hours and the hydrohead is notable at 109 mm. The MD and CD tenacity of the 80 g/m black SB PLA, which is laminated to pure PBAT with hot-melt adhesive, are higher than those with the SB PLA alone at 107 and 39 N, respectively, but its CD elongation is only 9.8%. However, the PBAT laminated SB PLA has higher bursting strength at 220 KN/m². The breathability is still good with a WVTR of 2459 g/m²/24 hours and a very high hydrohead of 3115 mm $H_2O$. The SB PLA laminated with PBAT containing 20% CaCO3 has similar properties to sample 8, except that the hydrohead still high at 2600 mm $H_2O$ becomes lower. The lamination of SB PLA with thinner PBAT film, and especially with thinner PBAT film deposited by extrusion coating, produces protective apparel for medical, industrial or sports applications. At this regard, the lamination has high MVTR for wearing comfort and high hydrostatic head for barrier protection. The barrier protection can be further enhanced by the application of a repellent finish (fluorochemical silicone or other types of repellent finishes) to either the PBAT film side or to the SB PLA on either side before or after lamination with the film Another enhancement is the lamination of MB PLA with SB PLA before or after lamination with the film. The repellent finishing agent can also possibly be added to the polymer melt used to produce the PBAT film, SB or MB PLA, for example.

When two layers of SB PLA are melt-adhesively bonded together to produce sample 9, the MD and CD tenacities and bursting strengths are essentially twice as those of one layer of sample 6. The target MD and CD tenacities and corresponding elongation-to-break (% elongation) values of patient lifting slings produced from 110 g/m² SB PP are at least 200 and 140 N/5 cm, respectively. As shown in Table 9, the MD tenacity of the two adhered layers of SB PLA is 215 N but their CD tenacity is only about 50% of the required level. Also the MD and CD % elongation values are much lower than the required minimum of 40%. The MD and CD elongations of SB PLA can be improved by blending PBAT from 5 to 60% (preferably from 20 to 50% PBAT) with the PLA prior to extrusion of the SB fabrics. Furthermore, PBAT and PBS may be blended with PLA to achieve fabric with the desired MD and CD tenacity and elongation values as well as stability to heat exposure. Furthermore, the SB filament web may be bonded by processes other than thermal point calendaring to achieve greater multi-directional strength and elongation to include hydroentanglement and needlepunching. Needlepunched SB PLA can be produced at greater weights than 110 g/m² without the need to laminate and bond two or more SB PLA fabrics together to achieve the required strength and elongation values.

TABLE 9

Strength and Barrier Properties of Laminates of PBAT Film with Meltblown (MB) Vistamaxx ® and Spunbond (SB) PLA and of a Laminate of Two SB PLA Layers

| Sample No./ Description | Weight g/m² | Thick mm | Tenacity N/5 cm | | Elongation % | | Tear Strength Trapzoid, N | | Burst Strength KN/m² | WVTR g/m²24 hr | Hydrohead mm H₂O |
|---|---|---|---|---|---|---|---|---|---|---|---|
| | | | MD | CD | MD | CD | MD | CD | | | |
| 1/Pure PBAT Film, 9 µm | 8.9 | 0.009 | 10.0 | 5.1 | 67.7 | 307.6 | 1.5 | 14.6 | *DNB | 3380 | 549 |
| 2/PBAT Film with 20% CaCO₃ | 9.3 | 0.010 | 8.9 | 4.1 | 48.1 | 296.3 | 1.8 | 8.0 | DNB | 2803 | 415 |
| 3/MB Vistamaxx & 20% PP | 42.1 | 0.229 | 17.2 | 11.6 | 304.0 | 295.8 | 16.0 | 8.6 | DNB | 8816 | 1043 |
| 4/PBAT Film + Vistamaxx | 63.9 | 0.242 | 31.4 | 16.0 | 179.5 | 390.0 | 24.6 | 8.5 | DNB | 1671 | 339 |
| 5/PBAT Film + 20% CaCO₃ + Vistamaxx | 65.3 | 0.249 | 25 | 17.7 | 116.6 | 541.9 | 22.0 | 10 | DNB | 1189 | 926 |
| 6/Black 80 gsm SB PLA | 81.3 | 0.580 | 102.4 | 30.7 | 3.6 | 30.7 | 6.2 | 12.0 | 177 | 8322 | 109 |
| 7/Black 80 gsm SB PLA + Pure PBAT Film | 101.3 | 0.584 | 107.0 | 39.2 | 4.6 | 9.8 | 8.5 | 20.7 | 220 | 2459 | 3115 |

TABLE 9-continued

Strength and Barrier Properties of Laminates of PBAT Film with Meltblown (MB)
Vistamaxx ® and Spunbond (SB) PLA and of a Laminate of Two SB PLA Layers

| Sample No./ Description | Weight g/m² | Thick mm | Tenacity N/5 cm | | Elongation % | | Tear Strength Trapzoid, N | | Burst Strength KN/m² | WVTR g/m²24 hr | Hydrohead mm H₂O |
|---|---|---|---|---|---|---|---|---|---|---|---|
| | | | MD | CD | MD | CD | MD | CD | | | |
| 8/Black 80 gsm SB PLA + PBAT Film-20% CaCO₃ | 96.5 | 0.557 | 97.0 | 36.3 | 4.9 | 8.0 | 9.3 | 19.0 | 151 | 2353 | 2600 |
| 9/2 Layers of Black SB PLA Bonded by 3 gsm hot-Melt | 183.6 | 1.060 | 215.3 | 76.8 | 4.9 | 9.4 | 14.7 | 22.5 | 503 | 7886 | 70 |

*DNB—free of burst due to high elasticity

The invention claimed is:

1. A biodegradable film comprising PHAs, PLA and cellulose fiber, wherein the content of PLA is 75%~85% in mass percent, and the PHAs are PHBs or PHVs, or copolymer or blend of PHBs and PHVs;
   wherein the PHBs are P(3HB-co-4HB) polymerized by 3HB and 4HB, and the mole percent of 4HB is 28%;
   wherein the biodegradable film is configured for producing film, container for solid and liquid, rigid or flexible package, woven, knitted and non-woven fabric with filament and staple fiber, and composite product of fabric and film;
   the non-woven fabric is produced through melt spinning which comprises spunbond and meltdown processes and is bonded by wet adhesive or dry adhesive;
   the non-woven fabrics are obtained by needlepunching, hydroentangling, thermal calendering, hot air through-air thermal bonding or the following heating processes including microwave, ultrasonic wave, welding, far infrared heating and near infrared heating;
   wherein the composite product of fabric and film is laminated film or fabric which combines with spinning laying, needlepunching, air laying of pulp or fiber, or hydroentangling processes;
   wherein the biodegradable film comprises biodegradable film and PBAT, and the least compatible blending ratio of PBAT and PLA of biodegradable film is 1:1 in mass percent.

2. The biodegradable film according to claim 1, wherein the laminated film or fabric comprises thermal spunbond-meltblown-spunbond type or ultrosonically bonded type, and wherein the composite product is used for industrial protective clothing and medical protective clothing.

3. The biodegradable film according to claim 1, wherein the composite product includes meltblown filter media which exists as outer and inner facings through spun bonding and is sewn or thermally or ultrasonically bonded on the edges.

4. Biodegradable laminate comprising the biodegradable film according to claim 1 and PBS;
   wherein the content of PBS is 5%~20% in mass percent in the biodegradable laminate, and wherein comprising blend of PBS and PBAT, and biodegradable film as recited according to claim 1.

* * * * *